3,158,510
CATALYTIC FUEL CELL ELECTRODE AND METHOD OF MAKING SAME
Gerhardt Taivenheimo, Chester, Pa., assignor, by direct and mesne assignments, of one-half to Air Products and Chemicals, Inc., Philadelphia, Pa., a corporation of Delaware, and one-half to Northern Natural Gas Company, Omaha, Nebr., a corporation of Delaware
No Drawing. Filed July 25, 1961, Ser. No. 126,496
5 Claims. (Cl. 136—122)

This invention relates to a method for making a rigid, porous carbon body suitable as a support or matrix for catalytic material in the formation of a fuel cell electrode.

Catalytic electrodes of the type embraced within the scope of the present invention find particular application as the active electrode elements of fuel cells for the electro-chemical oxidation of fuels, such as, hydrogen, hydrocarbons, alcohols, carbonyl compounds and the like to produce usable electrical energy.

In the formation of rigid, porous carbon supports or matrices for utilization as either a catalytic fuel electrode or oxygen electrode of a fuel cell it is a known practice to employ either non-porous baked carbon or graphite or combinations thereof as starting constitutents, and to mould or otherwise form a mix of such constituents into a rigid mass having an acquired structural porosity. Such supports do not provide the high surface area characteristics desirable in fuel cell electrodes since the surface properties of the porous carbon mass are a function of the external surface properties of the non-porous carbon particles making up the mass. Thus, the total surface area of electrodes so formed is not much, if any, greater than that of the geometric surface areas of all the particles, assuming that some additional surface area is derived from intra-particle cracks, fissures and other surface irregularities.

It has been found that such electrodes generally have a maximum surface area somewhat less than one $m.^2/g.$, which is considered much too low for the purpose of affording an adequate catalytically active surface for promoting the desired electro-chemical reactions.

To catalytically activate the electrode and to provide a substantial increase in surface area, various techniques have been employed, one such being disclosed in co-pending application, Serial No. 67,521, of James E. McEvoy and Harold Shalit for improvements in a Fuel Cell Electrode, filed November 7, 1960, now Patent No. 3,097,974. The disclosed technique involves the steps of: adsorbing a catalytic noble metal compound on activated carbon powder of finer than 200 mesh, U.S. Standard; forming a suspension of the noble metal impregnated carbon in a suitable liquid carrier, such as acetone; and introducing the suspension into a thin porous electrode matrix or support having an average pore diameter substantially greater than the particle-size range of the activated carbon powder, followed by drying at substantially ambient temperature.

While the foregoing technique produced an improved catalytic fuel cell electrode, there was an observed tendency for the finer particles of catalyst-containing activated carbon to flake off or fall out of the relatively large pores at the surface of the electrode matrix. To overcome such tendency the dried electrode is coated with a semi-sealant, such as silicone polymers, polymeric fluorocarbons, polystyrenes and other organic polymers in a suitable solvent. For example, the coating may comprise polymethylmethacrylate in acetone. Such coatings are semi-sealant in the sense that they bond the finely divided powder within the relatively large pores of the matrix.

In accordance with the invention a high surface area, porous carbon electrode or electrode matrix is formed as a laminate body comprising distinct layers of activated carbon and other carbonaceous material, such as baked carbon and/or graphite.

The layers are individually formed as a raw or green mix by combining the carbonaceous material in finely-divided form with a suitable liquid binder, such as a heavy residual hydrocarbon oil. While either the graphite or the baked carbon mix may readily be prepared in suitable paste form for moulding by addition of about 20–30 wt. percent of binder, the activated carbon mix is best prepared by addition of about 120–160 wt. percent of binder.

The maked carbon used in the mix may advantageously be obtained from a commercial form of baked carbon obtained in the form of a brick or cylinder and having, for example, a bulk density of about 66#/cu. ft. (1.03 g./cc.), a porosity of about 48%, and an average pore diameter of about 0.0013 in. (33 microns). Baked carbon used for experimental purposes in practicing the invention was National Carbon Co. Grade 60 porous baked carbon.

The porous graphite used in the mix also may be obtained commercially in the form of a brick or cylinder. Graphite used for experimental purposes in practicing the invention was National Carbon Co. Grade 20 porous graphite of the same bulk density and porosity as the baked carbon, but having an average pore diameter of about 0.0055 inch.

The activated carbon used in the mix is available commercially as a powder. A preferred form is of a size range, all through 200 mesh and at least 90% through 300 mesh, U.S. Standard. The powder has a bulk density of about 25#/cu. ft. (0.40 g./cc.), an average particle size of about 40–50 microns, and a surface area of about 800–1000 $m.^2/g.$ It may, for example, comprise a wood charcoal activated with heat and steam, then acid and water washed so that the final product contains less than a few percent of water extractables and is relatively low in chlorides, iron, copper, sulphides, calcium, etc. Such powder, used experimentally in practicing the invention, was Atlas Powder Co. Darco G–60.

In preparing the various ingredients for the mix, the solid forms, such as the commercial baked carbon and porous graphite, are repulverized. The resultant porous baked carbon powder has a size distribution, as determined by wet sieve analysis, of about 25–30 wt. percent on 100 mesh, 45–50 wt. percent on 200 mesh, 10–15 wt. percent on 325 mesh, and 10–15 wt. percent through 325 mesh, all U.S. Standard. The resultant porous graphite powder is of a size grade, all through about 20 mesh.

Portions of the various raw or green mixes are placed as shallow layers in compression moulds and compressed at a high pressure, such as in the range of about 1500–2500 p.s.i.g., preferably about 2000 p.s.i.g., to form thin plates of discs.

The thin flat plates or discs of raw mix are then arranged in laminar pattern in which the activated carbon and the non-porous carbon or graphite layers are arranged alternately, such as an internal layer of activated carbon and outside layers of either non-porous carbon or graphite. However, more than three layers may be employed in any suitable arrangement of active carbon, baked carbon and graphite. The composite raw electrode is then recompressed as before, until equilibrium of the binder has been achieved. Such recompression assures a strong interparticle bond between the several interfaces.

Following such recompression the composite electrode is baked in accordance with conditions required for the most difficult member of the series of layers, which in this instance is the activated carbon layer.

The mixing and baking techniques are closely similar to those disclosed in my companion application for improvements in a Fuel Cell Electrode, filed concurrently herewith as application Serial No. 126,495.

In one preferred mode of carrying out the invention a three layer electrode is prepared, consisting of a central layer of Atlas Powder Co. Darco G-60 activated carbon and outside layers of National Carbon Co. Grade 60 baked carbon. The laminar composite is then recompressed at a pressure in the range of 1500–2500 p.s.i.g., preferably about 2000 p.s.i.g., for a period up to about one hour, preferably about one-half hour, to achieve good interparticle mixing at the interfaces between the layers.

The composite electrode is then subjected to a preliminary baking step in a reducing atmosphere according to the following schedule. Initial baking is at a temperature in the range of 150–250° C., preferably about 200° C., for a period of 12–24 hours, preferably about 18 hours. The temperature is then gradually raised to a temperature of about 1000° C. or slightly higher over a period of 1–2 hours, preferably about 90 minutes. The elevated temperature is then held relatively constant for 30–90 minutes, preferably about 60 minutes, following which the composite is permitted to cool at ambient temperature.

A composite electrode prepared in accordance with the foregoing preferred technique was tested for water absorption and showed an absorption of 37.3 wt. percent of water. This is in contrast to the result obtained by testing one of the commercial Grade 60 carbon layers, which showed an absorption of only 27.3 wt. percent.

The invention thus makes possible the formation of highly porous rigid electrode matrices or supports having incorporated within the body of the matrix a high surface area activated carbon which is not subject to the flaking or falling off phenomenon which characterizes porous electrode supports wherein finely-divided activated carbon particles are applied to the surface of a matrix having relatively large pores without the application of a surface sealant. The method herein disclosed eliminates the need for surface sealing.

In order to render the completed matrix suitable for use as a catalytic anode or cathode of a fuel cell, the porous matrix structure is impregnated with suitable catalytic material, such as one of the noble metals, employing any of several known techniques or, for example, that disclosed in copending application, Serial No. 67,521, of James E. McEvoy and Harold Shalit, for improvements in a Fuel Cell Electrode, filed November 7, 1960, now Patent No. 3,097,974.

Obviously many modifications and variations of the invention as hereinbefore set forth may be made without departing from the spirit and scope thereof, and therefore only such limitations should be imposed as are indicated in the appended claims.

What is claimed is:

1. The method for making a porous matrix for a catalytic fuel cell electrode which comprises the steps of: forming separate raw mixes of non-porous carbonaceous material and high surface area activated carbon, each with a heavy liquid binder; forming said raw mixes into thin flat bodies of the desired matrix shape by compressing the same at a pressure in the range of 1500–2500 p.s.i.g.; alternately superimposing layers of said non-porous carbon and activated carbon bodies face-to-face to form a laminar pattern; recompressing the composite body at a pressure in the aforementioned range for a period sufficient to assure equilibrium of said binder and intimate intermingling of carbon particles throughout the several interfaces; subjecting said composite to initial baking at a temperature in the range of 150–250° C. for a period of 12–24 hours; gradually raising the temperature of said composite to about 1000° C. over a period of 1–2 hours; and subjecting said composite to a final baking by holding the attained high temperature substantially constant for a period of 30–90 minutes, followed by cooling at ambient temperature.

2. The method as in claim 1 in which said non-porous carbonaceous material comprises powdered baked carbon having a bulk density of about 66#/cu. ft., a porosity of about 48% and an average pore diameter of about 0.0013 in., and said activated carbon has a bulk density of about 0.40 g./cc., an average particle size of about 40 microns and a surface area of about 800–1000 m.$^2$/g.

3. The method as in claim 1 in which said non-porous carbonaceous material comprises powdered graphite having a bulk density of about 66#/cu. ft., a porosity of about 48%, and an average pore diameter of about 0.0055 in., and said activated carbon has a bulk density of about 0.40 g./cc., an average particle size of about 40 microns and a surface area of about 800–1000 m.$^2$/g.

4. The method as in claim 2 in which the compression of said separate raw mixes into the desired matrix shape and the recompression of said composite is effected at a pressure of about 2000 p.s.i.g.; said initial baking is at a temperature of about 200° C. for a period of about 18 hours; said gradual elevation of temperature to 1000° C. is effected within a period of about 90 minutes; and said period of constantly maintained high temperature is about one hour.

5. A catalytic fuel cell electrode prepared in accordance with the technique set forth in claim 1 and having a laminar matrix structure comprising outer porous layers composed of non-porous carbonaceous material and at least one inner porous layer composed of high surface area activated carbon, said matrix structure having impregnated therein well distributed particles of noble metal catalyst.

References Cited in the file of this patent

UNITED STATES PATENTS

| | | |
|---|---|---|
| 1,470,300 | Szarvasy | Oct. 9, 1923 |
| 2,000,815 | Berl | May 7, 1935 |
| 2,154,312 | MacCallum | Apr. 11, 1939 |
| 2,275,281 | Berl | Mar. 3, 1942 |